United States Patent [19]
Takamiya et al.

[11] Patent Number: 6,143,390
[45] Date of Patent: *Nov. 7, 2000

[54] LOW-TEMPERATURE REGENERATIVE TYPE MOISTURE ABSORBING ELEMENT

[75] Inventors: Hiroyuki Takamiya, Okayama; Tatsuaki Sumitani, Akashi; Masao Ieno, Okayama, all of Japan

[73] Assignee: Toyo Boseki Kabushiki Kaisha, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/695,820

[22] Filed: Aug. 5, 1996

[30] Foreign Application Priority Data

Aug. 4, 1995 [JP] Japan .................... 7-199932
Jan. 26, 1996 [JP] Japan .................... 8-011821

[51] Int. Cl.$^7$ ............... B32B 33/00; B05D 1/14
[52] U.S. Cl. ................... 428/90; 428/88; 428/97
[58] Field of Search ................... 428/90, 97, 88

[56] References Cited

U.S. PATENT DOCUMENTS

| | | | |
|---|---|---|---|
| 4,377,400 | 3/1983 | Okamoto et al. | 55/269 |
| 4,449,992 | 5/1984 | Yamada et al. | 55/158 |
| 4,886,769 | 12/1989 | Kuma et al. | 502/62 |
| 5,089,360 | 2/1992 | Kanno et al. | 428/288 |
| 5,204,175 | 4/1993 | Umeda et al. | 428/288 |
| 5,292,822 | 3/1994 | Tanaka et al. | 525/329.1 |
| 5,435,958 | 7/1995 | Dinnage et al. | |
| 5,853,879 | 12/1998 | Takamiya et al. | 428/364 |

FOREIGN PATENT DOCUMENTS

| | | |
|---|---|---|
| 3504116 | of 1985 | Germany . |
| 63-319021 | 12/1988 | Japan . |
| 5-248669 | of 1993 | Japan . |

OTHER PUBLICATIONS

Patent Abstracts of Japan, vol. 014, No. 086 (C–0690), Feb. 19, 1990 & JP 01 299624 A (Japan Exlan Co., Ltd.), Dec. 4, 1989.

*Primary Examiner*—Terrel Morris
*Assistant Examiner*—Cheryl Juska
*Attorney, Agent, or Firm*—Kenyon & Kenyon

[57] ABSTRACT

A low-temperature regenerative type moisture absorbing element of fast moisture absorbing and releasing speed, capable of regenerating at 110° C. or less and having a sufficiently high moisture absorbing and releasing performance in spite of small size is provided. A low-temperature regenerative type moisture absorbing element is mainly composed of high moisture absorbing and releasing polymeric compound with the content of salt type carboxyl group adjusted to a specific amount, and further comprises plural gas passages, of which regeneration temperature is 110° C. or less. It is hence possible to provide a moisture absorbing element of small size, high efficiency, and energy-saving type, being excellent in moisture absorbing and releasing performance, and easily capable of removing absorbed moisture at low temperature which was impossible with the conventional moisture absorbing element. It can be applied not only in industrial and commercial uses, but also in household dehumidifying and drying applications, and may be employed in dehumidifying and drying applications of various gases.

9 Claims, 9 Drawing Sheets

LOW-TEMPERATURE REGENERATIVE TYPE MOISTURE ABSORBING ELEMENT

BACKGROUND OF THE INVENTION

1. Field of the Invention

The present invention relates to a moisture absorbing element for dehumidifying and drying in an apparatus designed to dehumidify and dry gas containing water vapor. More particularly, it relates to a moisture absorbing element that is excellent in moisture absorbing performance, capable of easily remove absorbed moisture at low temperature, and is reusable by regeneration.

2. Description of the Related Prior Art

When using a moisture absorbing material in dehumidifying and drying gas containing water vapor, elements carrying moisture absorbing material on the inner wall of plural gas passages are generally employed. A method of forming moisture absorbing elements is to shape into honeycomb structure having plural gas passages by laminating metal plates such as aluminum, paper sheets of inorganic fibers, or nonwoven fabrics, etc., and carrying, before or after this process, any substance selected from silica gel, synthetic zeolite, active carbon, deliquescent substance such as lithium chloride, and calcium chloride, as moisture absorbing material.

The moisture absorbing material used in the prior art is mainly silica gel, moisture absorption rate of which is 40 wt. % at most, while zeolite or active carbon is about 25 wt. % in moisture absorption rate. Herein, the moisture absorption rate refers to the rate of weight of absorbed moisture in a sample when moisture is absorbed at equilibrium at 20° C., 65% RH to weight of the sample in complete dry state. It is necessary to use a binder to prepare moisture absorbing elements by impregnating these materials in elements, and therefore in such case the moisture absorption characteristic become low. To enhance the practical moisture absorption efficiency, at the present, the moisture absorbing elements must be increased in size.

To remove the moisture once absorbed in the moisture absorbing elements, there are various methods such that heated air is sent in, that heating wires are passed in the elements to heat them, etc. Hereinafter, this temperature is called the regeneration temperature. In the conventional moisture absorbing elements, when the regeneration time is about 30 minutes, the regeneration temperature is over 120° C. This is because the releasing performance of the moisture adsorbed on the moisture absorbing elements is poor, and much regeneration air is needed when regenerating. And high temperature as such is not preferable from the viewpoint of energy. In particular, when deliquescent substances such as lithium chloride and calcium chloride are carried as moisture absorbing materials, the problems of high regeneration temperature and long regeneration time become more obvious. Moreover, when the regeneration temperature is high, it is not suited to use to dehumidify and dry in house from the aspects of safety and energy. For household use, the regeneration temperature should be 110° C. or less, preferably 80° C. or less. If the conventional moisture absorbing elements are regenerated at such temperature, it takes a very long time in regeneration, and the time used for dehumidifying and drying air as the intrinsic function of moisture absorbing elements is sacrificed.

Owing to such problems, moisture absorbing elements had been not used in household dehumidifiers. The conventional household dehumidifiers were of refrigerating type. Therefore drain produced must be discharged regularly, and the room space was occupied because of stationary type.

In this background, there was a demand for a dehumidifying and drying apparatus having a high moisture absorbing performance, capable of easily removing absorbed moisture at 110° C. or less, which can be installed in the window, wall, floor, ceiling, etc., and does not produce drain to be discharged.

SUMMARY OF THE INVENTION

The object of the present invention is to solve such conventional problems and to provide low-temperature regenerative type moisture absorbing elements having high moisture absorbing and releasing properties and fast moisture absorbing and releasing speed, which can be regenerated at 11° C. or less.

The present inventors have intensively studied about materials having high moisture absorbing and releasing properties, with the regeneration temperature of about 70° C. As a result, it was found that the problems can be solved by forming the moisture absorbing elements mainly of high moisture absorbing and releasing polymeric compound containing salt type carboxyl group, and the invention was completed. That is, the invention presents a low-temperature regenerative type moisture absorbing element mainly composed of high moisture absorbing and releasing polymeric compound containing 2.5 to 10.0 meq/g of salt type carboxyl group, further comprising plural gas passages, wherein the regeneration temperature required for removal of absorbed moisture is 110° C. or less. Also in the invention, the high moisture absorbing and releasing polymeric compound is crosslinked by a hydrazine compound and is flame retardant, and/or the high moisture absorbing and releasing polymeric compound is fibrous. Moreover, in the invention, the fibrous high moisture absorbing and releasing polymeric compound is processed by flocking.

DETAILED DESCRIPTION OF THE INVENTION

The invention will be described in more detail below.

The high moisture absorbing and releasing polymeric compound containing salt type carboxyl group used in the invention is not particularly limited as far as the polymeric compound contains salt type carboxyl group by 2.5 to 10.0 meq/g. If the high moisture absorbing and releasing polymeric compound contains salt type carboxyl group by less than 2.5 meq/g, the moisture absorbing capacity is too small, and the elements must be increase in size, and the blower used in regeneration must be also large in size and energy increases, and various problems are involved. Or, if the content of the salt type carboxyl group exceeds 10.0 meq/g, the high moisture absorbing and releasing polymeric compound cannot retain its own shape, and if once processed into a moisture absorbing element, it cannot be reused. Moreover, considering the moisture absorbing capacity and dimensional stability, the content of the salt type carboxylic group is preferred to be 4.0 to 8.5 meq/g. The moisture absorbing element mainly composed of this high moisture absorbing and releasing polymeric compound and comprising plural gas passages has a high moisture absorbing and releasing performance, and can be easily regenerated at 110° C. or less, so that the low-temperature regenerative type moisture absorbing element of fast moisture absorbing and releasing speed is presented.

Herein "mainly composed of" means the high moisture absorbing and releasing polymeric compound is contained in the entire moisture absorbing element by 50 wt. % or more, and more preferably by 70 wt. % or more. This is because the characteristics of the high moisture absorbing and releasing polymeric compound can be utilized effectively. As other constituent elements, anything may be selected, but it is preferred to select materials having moisture absorbing properties. Examples of such materials include pulp, rayon, wool, nylon, cotton, starch, and polyvinyl alcohol, among others.

Methods for obtaining the high moisture absorbing and releasing polymeric compound include a method of obtaining a polymer by homopolymerizing a monomer having salt type carboxyl group, or copolymerizing with other copolymerizable monomer, a method of modifying into salt type after obtaining a polymer having carboxyl group, a method of introducing carboxyl group by chemical modification, and others.

Other examples include a method of obtaining a high moisture absorbing and releasing polymeric compound by polymerizing after impregnating a monomer having salt type carboxyl group in nonwoven fabric, paper, sponge or the like, a method of obtaining a high moisture absorbing and releasing polymeric compound by impregnating a monomer having carboxyl group, polymerizing, and modifying into salt type, and a method of obtaining a high moisture absorbing and releasing polymeric compound by impregnating a monomer capable of introducing carboxyl group by chemical modification, polymerizing, and modifying chemically to introduce salt type carboxyl group.

Also included are a method of obtaining a high moisture absorbing and releasing polymeric compound by impregnating a polymeric compound containing salt type carboxyl group in nonwoven fabric, paper or sponge, a method of obtaining a high moisture absorbing and releasing polymeric compound by impregnating a polymeric compound having carboxyl group and modifying into salt type, and a method of obtaining a high moisture absorbing and releasing polymeric compound by impregnating a polymeric compound capable of introducing carboxyl group by chemical modification, and modifying chemically to introduce salt type carboxyl group.

However, as far as a polymeric compound containing salt type carboxyl group by 2.5 to 10.0 meq/g, the method of obtaining the high moisture absorbing and releasing polymeric compound is not limited to the mentioned methods alone.

In the method of obtaining a high moisture absorbing and releasing polymeric compound by polymerizing a monomer having salt type carboxyl group, for example, a copolymer may be obtained by homopolymerizing salt type monomer of vinyl and/or vinylidene system containing carboxyl group, such as acrylic acid, methacrylic acid, maleic acid, itaconic acid, and vinyl propionic acid, or copolymerizing two or more kinds thereof, or copolymerizing with other copolymerizable monomers. The salt type of carboxyl group includes alkaline metals such as Li, Na, K, alkaline earth metals such as Be, Mg, Ca, Ba, and organic cations such as ammonia and amine.

In the method of modifying into salt type after obtaining a polymer containing carboxyl group, for example, a copolymer is obtained by homopolymerizing salt type monomer of vinyl and/or vinylidene system containing carboxyl group, or copolymerizing two or more kinds thereof, or copolymerizing other copolymerizable monomer, as mentioned above, thereafter the copolymer is modified into salt type. In the method of modifying carboxyl group into salt type, the obtained polymeric compound is neutralized with hydroxides of alkaline metals such as Li, Na, K, or hydroxides of alkaline earth metals of Be, Mg, Ca, Ba, or basic substances such as ammonia and amine, or the obtained polymeric compound is treated in a solution containing much amounts of cations of alkaline metals or alkaline earth metals, or organic cations of NH4, amine, etc. to conduct ion-exchange.

In the method of introducing a carboxyl group by chemical modification, for example, after obtaining a polymer containing monomer capable of obtaining carboxyl group by modification treatment, it is modified into carboxyl group by hydrolysis, and if it is not salt type, it is modified into salt type in the above methods. Examples of monomer usable in such method include, among others, monomers having cyano group such as acrylonitrile and methacrylonitrile; anhydrides of acrylic acid, methacrylic acid, maleic acid, itaconic acid, vinyl propionic acid, and others, and their derivatives, for example, methyl acrylate, ethyl acrylate, normal propyl acrylate, isopropyl acrylate, normal butyl acrylate, normal octyl acrylate, acrylic acid-2-ethyl hexyl, methyl methacrylate, ethyl methacrylate, hydroxyl ethyl methacrylate, and other esters, acrylamide, monomethacrylamide, dimethyl acrylamide, monoethyl acrylamide, normal-t-butyl acrylamide, methacrylamide, monomethyl methacrylamide, dimethyl methacrylamide, and other amides. As other method of introduction of carboxyl group by chemical modification, for example, oxidation of alkene, halogenated alkyl, alcohol, aldehyde, etc. may be also available.

Other monomers copolymerizable with the monomers mentioned above include vinyl chloride, vinyl bromide, vinyl fluoride, other halogenated vinyl compounds; vinylidene chloride, vinylidene bromide, vinylidene fluoride, other vinylidene derivative monomers; vinyl formate, vinyl acetate, vinyl monochloroacetate, vinyl dichloroacetate, vinyl trichloroacetate, vinyl monofluoroacetate, vinyl difluoroacetate, vinyl trifluoroacetate, and other vinyl esters: p-styrene sulfonic acid, allyl sulfonic acid, methallyl sulfonic acid, 2-acrylamide-2-methyl propane sulfonic acid, sulfopropyl methacrylate, vinyl stearic acid, vinyl sulfinic acid, other organic acid compound containing vinyl group, or salt, anhydride, and derivative thereof; methyl vinyl ether, ethyl vinyl ether, other vinyl ethers; methyl vinyl ketone, ethyl vinyl ketone, phenyl vinyl ketone, other vinyl ketones; N-vinyl phthalimide, N-vinyl succinoimide, other vinyl imides; N-vinyl pyrrolidone.

N-vinyl carbazole, vinyl furane, vinyl pyridine, and others. Also polyfunctional monomers are usable, including, among others, divinyl benzene, methylene bisacrylamide, ethylene glycol diacrylate, ethylene glycol dimethacrylate, diethylene glycol diacrylate, diethylene glycol dimethacrylate, triethylene glycol diacrylate, triethylene glycol dimethacrylate, trimethylol propane triacrylate, and trimethylol propane trimethacrylate. As vinylidene monomers, vinylidene chloride, vinylidene bromide, vinylidene fluoride, and others may be used.

As the structure of the moisture absorbing element, it is not particularly limited as far as the moisture absorbing element is mainly composed of high moisture absorbing and releasing polymeric compound containing 2.5 to 10.0 meq/g of salt type carboxyl group and comprises plural gas passages. However, to utilize the capacity as the moisture absorbing element to the maximum extent, it is preferred that the gas resistance is not too strong when sending the gas containing water vapor into the element, and that the gas contacting area is wide, so that adsorption of water vapor onto the moisture absorbing element may be promoted. If necessary, the both ends or circumference of the moisture absorbing element may be reinforced by processing with resin or the like.

Figure 1:
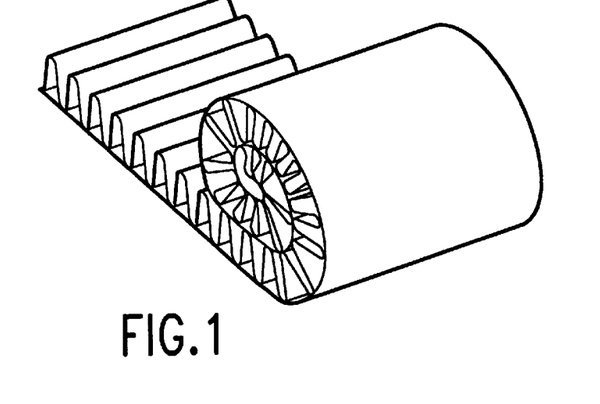
FIG. 1 is an explanatory view of a cylindrical element form comprising plural gas passages.
Figure 2:
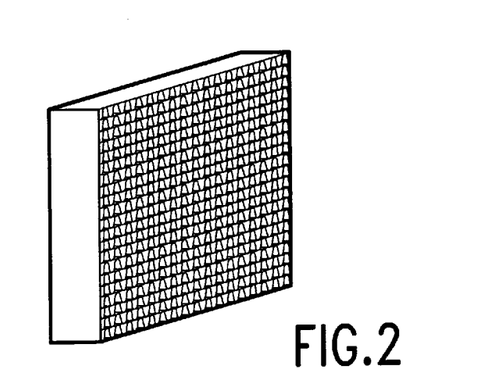
FIG. 2 is an explanatory view of a block-shaped element form comprising plural gas passages.
Figure 3:
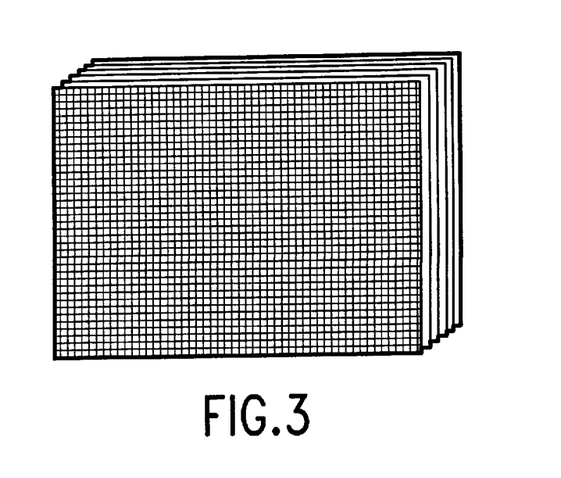
FIG. 3 is an explanatory view of an element form comprising plural gas passages in mesh shape.
Figure 4:
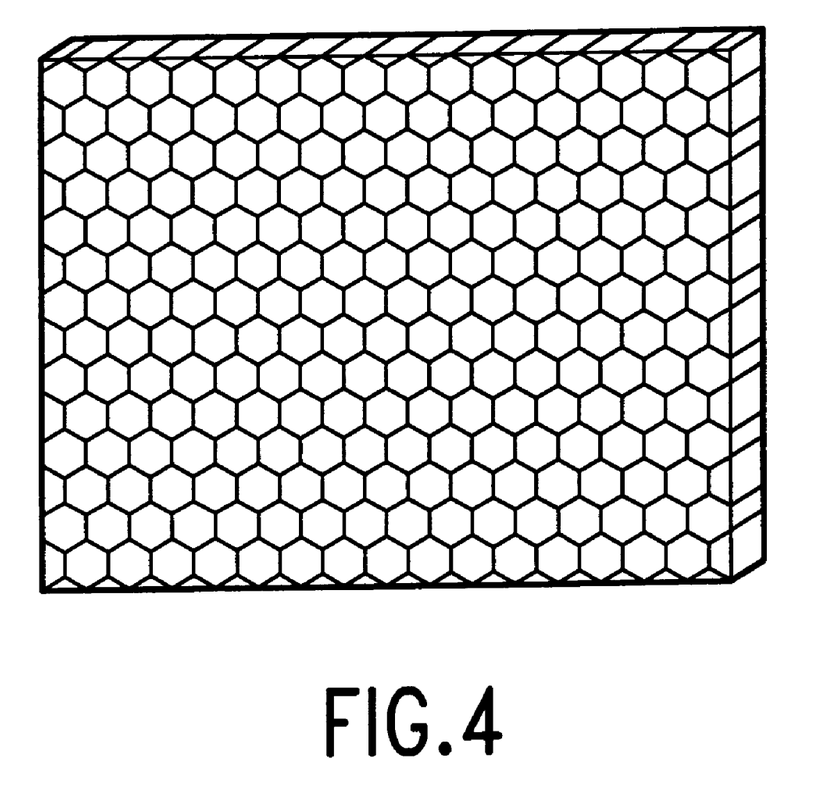
FIG. 4 is an explanatory view of an element form comprising plural gas passages in honeycomb shape.

Examples of structure of such moisture absorbing element include a method of corrugating and laminating into a cylindrical form as shown in FIG. 1. and a method of laminating in a form as shown in FIG. 2. Besides, woven fabric, nonwoven fabric, or paper possessing gas passages may be laminated in plural layers as shown in FIG. 3, or the structure having gas passages as shown in FIG. 4 may be formed, but it is not limited to the illustrated forms alone. As the binder used when fabricating such structure, starch, polyvinyl alcohol, and other hydrophilic materials are preferred, but it is not particularly limited.

The high moisture absorbing and releasing polymeric compound for composing the moisture absorbing element is preferred to have an adequate crosslinked structure. As the adequate crosslinked structure, it is preferred to crosslink to such a degree that the shape of the moisture absorbing element may be retained when the high moisture absorbing and releasing polymeric compound absorbs moisture, and the degree of water swelling is preferred to be 15 times or less, more preferably 5 times or less. Herein, the degree of water swelling refers to how many times of the weight of high moisture absorbing and releasing polymeric compound in complete dry state the weight of water is retained, when the completely dried compound is immersed in water.

The reason of introducing such adequate crosslinking is, as mentioned above, not to dissolve or swell excessively when the moisture absorbing element absorbs moisture. If dissolving or swelling excessively without introducing crosslinking, the functional group responsible for moisture absorption in the high moisture absorbing and releasing polymeric compound cannot sufficiently contact with the gas containing water vapor. Besides, the gas passages are narrowed by swelling, and absorption of moisture and release of absorbed moisture are not done efficiently.

Methods of introducing crosslinking include a method of copolymerizing a polyfunctional monomer, a method of modifying chemically after crosslinking a polymer, and a method of crosslinking after introducing carboxyl group, among others, but it is not limited to these methods alone. As far as the degree of water swelling is 15 times or less in the compound containing salt type carboxylic group of the invention, any method may be employed, for example, pseudo-crosslinking, such as fixing salt type carboxyl group spuriously by polymeric network formed by polymerizing monomer containing carboxyl group in gel of polyvinyl alcohol or the like. The crosslinked structure may be introduced either before or after processing into the element form, or before or after introducing the carboxyl group.

The most suited structure as crosslinked structure is that the crosslinked structure itself has moisture absorbing property. As such crosslinked structure, the inventors consider it proper to use hydrazine compound. Usable examples of hydrazine compound include hydrate hydrazine, hydrazine sulfate, hydrazine hydrochloride, hydrazine nitrate, hydrazine bromate, and hydrazine carbonate, and also ethylene diamine, guanidine sulfate, guanidine hydrochloride, guanidine nitrate, guanidine phosphate, melamine, and other polyamino compounds. By crosslinking with hydrazine compound, a flame retardant high moisture absorbing and releasing polymeric compound is obtained, so that the moisture absorbing element with high safety in household may be provided.

Herein, the flame retardant high moisture absorbing and releasing polymeric compound refers to the compound of which LOI according to JIS K 7201 exceeds 20, or the compound evaluated to be self-extinguishing as measured in accordance with JIS D 1201.

The degree of crosslinking when introducing a crosslinked structure by hydrazine compound is preferred so that the increment of nitrogen content may be 1.0 to 10.0 wt. %, in consideration of the flame retardance, amount of salt type carboxyl group, and degree of water swelling.

The form of the high moisture absorbing and releasing polymeric compound may be sponge, fiber, film, plate, or any other as far as it can be processed into an element comprising plural gas passages. In particular, when the high moisture absorbing and releasing polymeric compound is in a fibrous form, various processings are possible owing to its form, strength, elongation, and other features. When the high moisture absorbing and releasing polymeric compound is fibrous, it can be processed into the moisture absorbing element after once processing in woven fabric, nonwoven fabric, paper, raised or flocked form.

Methods of fabricating a structure in which moisture adsorption on the moisture absorbing element may be promoted include a method of increasing the contacting area of water vapor with the moisture absorbing element. For example, when the high moisture absorbing and releasing polymeric compound for composing the element is fibrous, the fiber is made very fine, the fiber length is extremely shortened, or the obtained fiber is fibrillated. The high effect is obtained even if the fiber is hollow or contains many voids. Of course, it is also effective to form the gas passages as small as possible, as far as free from problem of pressure loss in the apparatus, so as to contact with the high moisture absorbing and releasing polymeric compound more widely. It is also effective to lower the density of the material for composing the moisture absorbing element such as woven fabric, nonwoven fabric, and paper.

Above all, by flocking a fibrous high moisture absorbing and releasing polymeric compound, the other portions than leading ends of fibers contact more easily with water vapor, and therefore, as compared with the paper or nonwoven fabric, the capacity of the fibrous high moisture absorbing and releasing polymeric compound can be utilized extremely effectively. Besides, when such flocked piece is processed into a moisture absorbing element, the time required for moisture absorption and the time required for regeneration may be extremely short. That is, the humidity can be controlled easily by increasing or decreasing the number of cycles of regeneration and moisture absorption per unit time, or increasing or decreasing the moisture absorption time or regeneration time per cycle.

So far, the low-temperature regenerative type moisture absorbing elements of the invention have been explained in household use, but they may be also used in application of dehumidifying and drying various gases, not limited to dehumidifying and drying of water vapor in the air. Applicable examples include methane gas, ethane gas, propane gas, butane gas, ethylene gas, acetylene gas, other hydrocarbon gases, hydrogen, carbon dioxide, carbon monoxide, helium, nitrogen, oxygen, argon, hydrogen sulfide, nitrogen oxides, and ammonia gas, but the scope is not limited to these examples alone.

The moisture absorbing element of the invention is a moisture absorbing element that can be regenerated at low temperature of 110° C. or less, and particularly it is effective even at 80° C. or less. Herein, the regeneration temperature refers to the temperature required to removed the absorbed moisture in order to use again after the moisture absorbing element has absorbed moisture, and more specifically it means the temperature at which more than 80 wt. % of the absorbed moisture in the moisture absorbing element is removed in 30 minutes. Besides, when regenerated in a longer time than 30 minutes, for example, in several hours, the moisture absorbing element of the invention can be regenerated at a very low temperature of about 50° C. Hence, as compared with the conventional moisture absorbing element which cannot be regenerated at temperature lower than 120° C. in a short time, the low-temperature regenerative type moisture absorbing element of the invention is very excellent in the aspects of safety and energy.

Moreover, since the moisture absorbing element of the invention is mainly composed of high moisture absorbing and releasing polymeric compound, as compared with the moisture absorbing element made of metal plate or ceramics, the weight is extremely light. Hence the weight load on the apparatus is lessened, and it is easy to install in the wall, ceiling, etc.

In the invention, by using the polymeric compound containing 2.5 to 10.0 meq/g of salt type carboxyl group having high moisture absorbing and releasing performance as the constituent element of moisture absorbing element, the amount of moisture that can be absorbed is significantly increased from the conventional moisture absorbing element. Although the reason of high moisture absorbing performance of the high moisture absorbing and releasing polymeric compound of the invention is not fully clarified, but it is generally considered as follows. Generally, the salt type carboxyl group has a moisture absorbing property, and using such polymeric compound as a principal constituent element, the contacting area with water vapor is increased, so that the moisture absorbing element has come to have a high moisture absorbing performance.

The moisture absorbing element of the invention has high moisture absorbing property and can be regenerated at low temperature of less than 110° C., the action of which is not elucidated, but it is estimated that the water vapor moving speed in the high moisture absorbing and releasing polymeric compound used as the principal constituent element of the moisture absorbing element is faster than in the conventional moisture absorbing material.

When the high moisture absorbing and releasing polymeric compound is crosslinked by hydrazine compound, nitrogen is contained in the crosslinked structure. This nitrogen shows a very strong polarity, and affinity for water is further enhanced as compared with the case of salt type carboxyl group alone, which is considered to improve the moisture absorbing performance. Still more, because of the crosslinked structure, hydrogen bonding of carboxyl group is blocked, which is estimated to act effectively for moisture absorption.

The reason is not known why crosslinking by hydrazine compound produces flame retardant high moisture absorbing and releasing polymeric compound. However, it may be estimated that the flame retardance is achieved when the nitrogen content is increased by such crosslinking and/or the carboxyl group is of salt type.

When the high moisture absorbing and releasing polymeric compound is fibrous, various processings are possible owing to its form, strength, elongation, and other features, and various forms of elements having plural gas passages can be manufactured.

When the fibrous high moisture absorbing and releasing polymeric compound is flocked, the contacting area with water vapor is very wide, and hence the time required for moisture absorption and regeneration seems to be shortened.

EXAMPLES

Examples for ease of understanding of the invention are described below. These are only illustrative examples, and the invention is not limited thereby. In the examples and comparative examples, the parts and percentage are expressed in the standard by weight unless otherwise noted.

Incidentally, the amount of salt type carboxyl group (meq/g), moisture absorption rate (%) of high moisture absorbing and releasing polymeric compound, element moisture absorbing characteristic (%), element regeneration characteristic (%), flame retardance (LOI), flammability, and regeneration temperature characteristic were determined in the following methods.

(1) Amount of Salt Type Carboxyl Group (meq/g)

About 1 g of sufficiently dried high moisture absorbing and releasing polymeric compound is weighed precisely (X g), and to this 200 ml of water is added, and while heating at 50° C., 1N hydrochloric acid aqueous solution is added until pH2, and titration curve is obtained by conventional method with 0.1N sodium hydroxide aqueous solution. From the titration curve, the sodium hydroxide aqueous solution consumed for carboxyl group is determined (Y ml), and the amount of carboxyl group is calculated in the following formula.

(Amount of carboxyl group)=0.1Y/X

Separately, a titration curve is similarly obtained without adjusting pH to 2 by adding 1N hydrochloric acid aqueous solution during operation for measurement of amount of carboxyl group above, and the amount of carboxylic acid is determined. Hence, it is calculated in the following formula.

(Amount of salt type carboxyl group)=(amount of carboxyl group)−(amount of carboxylic acid)

(2) Moisture Absorption Rate of High Moisture Absorbing and Releasing Polymeric Compound (%)

About 5.0 g of high moisture absorbing and releasing polymeric compound as sample is completely dried in a hot air dryer at 105° C., and weighed (W1 g). This sample is put in a thermo-hygrostat at 20° C. and 65% RH until reaching equilibrium. Thus moisture absorbing sample is weighed (W2 g).

From the results of measurement, it is calculated as follows.

(Moisture absorption rate)=(W2−W1)/W1×100

(3) Element Moisture Absorbing Characteristic (%)

The moisture absorbing element as sample is put in a vacuum dryer at 70° C. for 16 hours, and weighed, and this weight is the 70° C. dry weight of the element (W3). This element is put in a thermo-hygrostat at constant humidity and 27° C., and the weight when reaching the equilibrium of moisture absorption is obtained as element equilibrium moisture absorbing weight (W4), and it is calculated as follows.

(Element moisture absorbing characteristic)=(W4−W3)/W3×100

(4) Element Regeneration Characteristic (%)

The element moisture absorbing characteristic of the moisture absorbing element as sample is measured at 27° C., 60% RH, and hot air at 70° C. is passed in a direction orthogonal to the element, and the weight of the element at every specific time interval is determined as W4 in the formula of the element moisture absorbing characteristic, which is obtained as the element regeneration characteristic (%).

(5) Flame Retardance LOI

Conforming to measurement of oxygen index in JIS K 7201.

(6) Flammability

Conforming to measurement of JIS D 1201.

(7) Regeneration Temperature Characteristic (%)

Hot air set at different temperatures is blown for 30 minutes each to the sample of equilibrium moisture absorption after measurement of moisture absorption rate (%) of sample, and the sample is weighed (W5) at this time. It is calculated in the following formula.

(Regeneration temperature characteristic)=(W2−W5)/(W2−W1)×100

Example 1

Figure 5A:
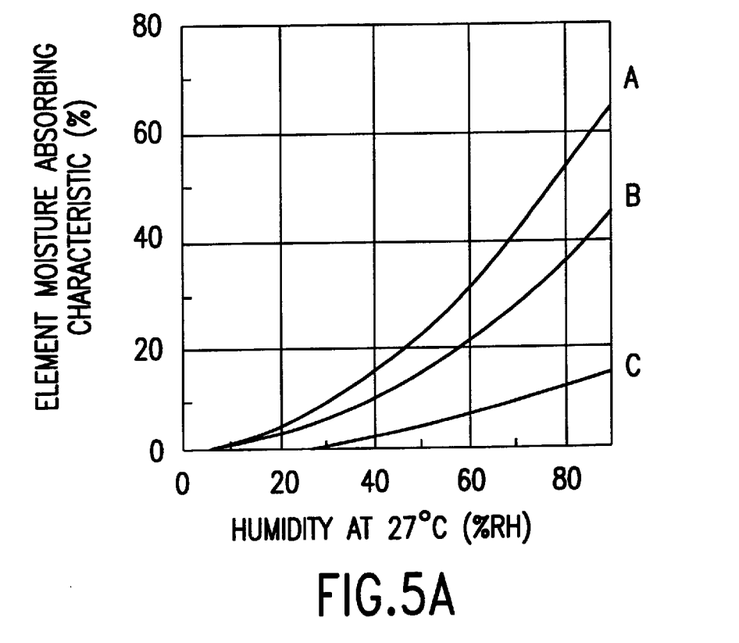
FIG. 5 is a diagram showing element moisture absorption characteristic and element regeneration characteristic of example 1.
Figure 5B:
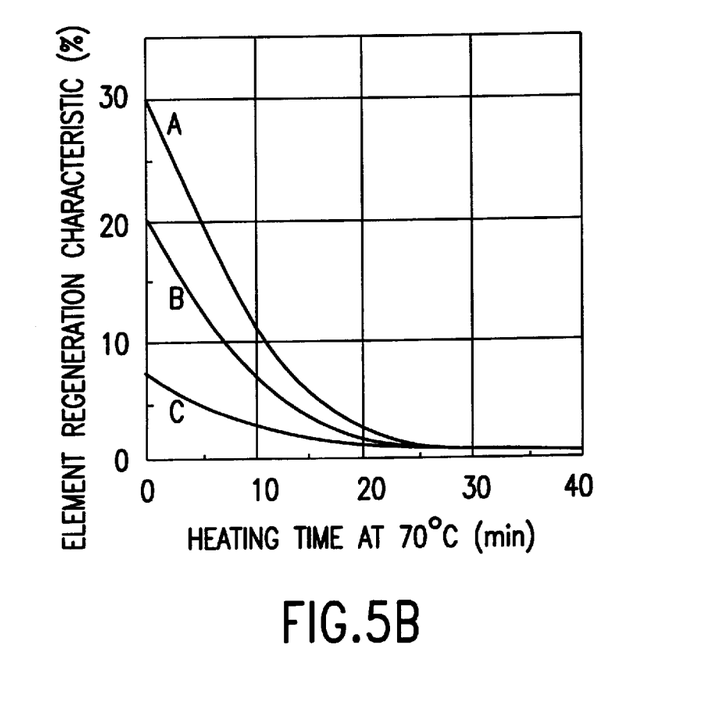

A nonwoven fabric having weight of 150 g/m² and thickness of 700 μm was prepared from 2d vinylon fiber and vinylon heat fusible (binder) fiber. In addition, a monomer concentrated aqueous solution with weight of ammonium persulfate of 1 to 100 by weight of sodium acrylate was also prepared. Selecting the amounts of concentrated aqueous solution for impregnating in the nonwoven cloth in the conditions shown in Table 1, samples were dried while polymerizing in a room at 70° C. Results of testing the characteristics of thus obtained nonwoven fabric samples Nos. 1 to 3 are summarized in Table 1. Using the obtained woven fabric samples Nos. 1 to 3, they were processed into an element form as shown in FIG. 1 by using a slight amount of starch adhesive, and elements A to C were prepared, and the element moisture absorbing characteristic and element regeneration characteristics were investigated, of which results are shown in FIG. 5, and the result of investigation of combustibility is given in Table 1.

TABLE 1

| | | Example | Invention | Invention | Comparison |
|---|---|---|---|---|---|
| | Nonwoven fabric sample | No. | 1 | 2 | 3 |
| Nonwoven fabric preparation condition | Vinylon nonwoven fabric | (ratio by weight) | 2 | 4 | 7 |
| | Sodium acrylate | (ratio by weight) | 1 | 1 | 1 |
| Nonwoven fabric characteritic | Amount of Na type carboxyl group | (meq/g) | 5.4 | 3.6 | 2.3 |
| | Moisture absorption rate (20° C. 65% RH) | (%) | 43 | 29 | 10 |
| | Processed element | No. | A | B | C |
| Element characteristic | Combustibility | | Flame retardant | Combustible | Combustible |

As known from Table 1, the moisture absorption rate is high in nonwoven fabric samples Nos. 1 and 2 used as the elements of the invention. As clear from FIG. 5, although elements A and B of the invention are very high in element moisture absorption characteristic, they are almost completely dried in about 20 minutes even by drying at low temperature of 70° C.

In contrast thereto, element C of comparative example prepared by using nonwoven fabric sample No. 3 which is low in the content of salt type carboxyl group is small in the moisture absorption rate although the regeneration time is almost same as in elements A and B of the invention, and therefore in order to obtain the same moisture absorption as the level of the invention, it is known that the element must be increased in size.

Example 2

To 90 parts of 48% sodium thiocyanate aqueous solution, 10 parts of acrylonitrile (hereinafter called AN) copolymer composed of 90% of AN and 10% of methyl acrylate (hereinafter called MA) was dissolved to prepare polymeric solution at 70° C., and gel spread in a film form was prepared in 15% sodium thiocyanate aqueous solution at 0°

Figure 6A:
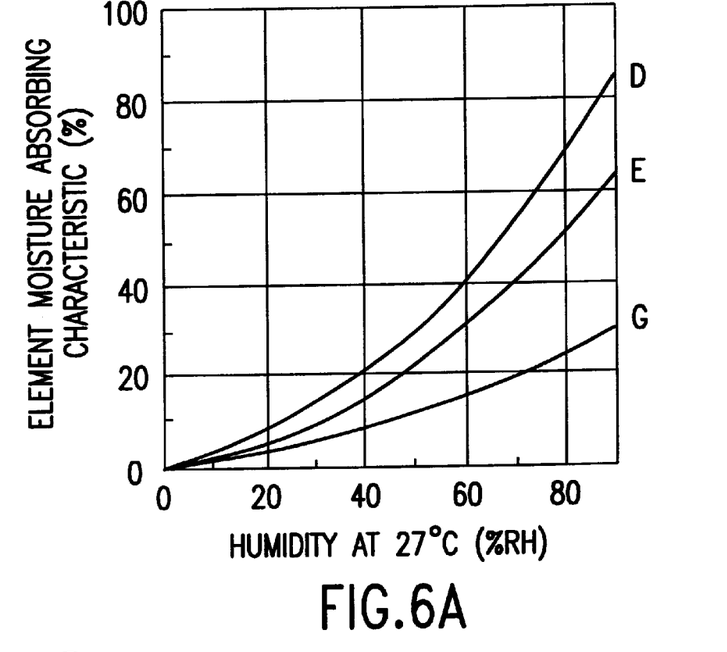
FIG. 6 is a diagram showing element moisture absorption characteristic and element regeneration characteristic of example 2.
Figure 6B:
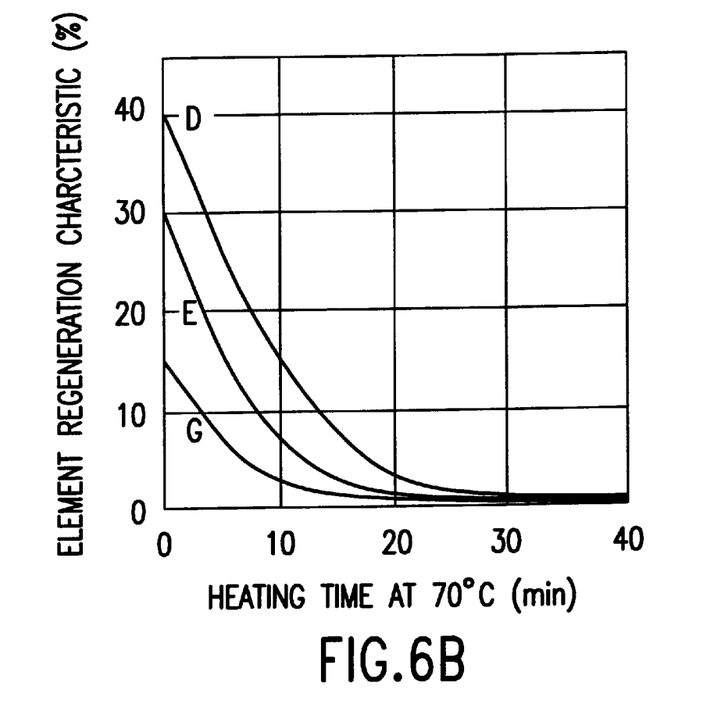

C., and this gel was gradually extended and washed in both longitudinal direction and lateral direction in warm water gradually raised in temperature, and a gel film extended five times in both longitudinal direction and lateral direction was obtained. This film was taken up in a tense state while passing through a drying roller, and a film of 50 μm m in thickness was obtained. In the taken-up state, thus obtained acrylic film was directly put in a reactor, and reacted with hydrate hydrazine in the condition shown in Table 2, washed in water, reacted with sodium hydroxide aqueous solution in the condition shown in Table 2, washed in water, and taken out from the reactor, and drained by a squeezing roller, dried by a drying roller, and film samples Nos. 4 to 7 were obtained. Results of investigating the characteristics of obtained films are shown in Table 2. Using these film samples, and using a slight amount of polyvinyl alcohol adhesive, they were formed into an element as shown in FIG. 2, and elements D to G were obtained. The moisture absorption characteristic and regeneration characteristic of these elements are shown in Table 2. The combustibility is also recorded in Table 2.

in moisture absorption rate, but it had almost no strength and could not be processed into element (element F). As understood from Table 2 and FIG. 6, comparative film sample No. 7 was too low in the content of carboxyl group, and was poor in moisture absorption capability, and hence the element G manufactured from this sample must be increased in size.

Elements D and E of the invention crosslinked with hydrate hydrazine and made from film having the specified content of salt type carboxyl group of the invention are found to be self-extinguishing as clear from Table 2. It is known that crosslinking with hydrate hydrazine produces low-temperature regenerative type moisture absorbing element with high safety.

Example 3

Tow of 0.8d acrylic fiber was put in a reactor, and reacted with hydrate hydrazine in the condition shown in Table 3, washed in water, reacted with sodium hydroxide aqueous solution in the condition shown in Table 3, washed in water, taken out of the reactor, drained, and cut, and fiber samples Nos. 8 to 10 were obtained. Characteristics of obtained fiber

TABLE 2

| | Example | | Invention | Invention | Comparison | Comparison |
|---|---|---|---|---|---|---|
| | Film sample | No. | 4 | 5 | 6 | 7 |
| Crosslinking condition | Hydrate hydrazine treatment | (%) | 35 | 35 | 5 | 35 |
| | | (° C.) | 100 | 103 | 90 | 103 |
| | | (Hr) | 3 | 4 | 2 | 5 |
| Carboxyl group introduction | NaOH treatment | (%) | 10 | 10 | 5 | 80 |
| | | (° C.) | 100 | 90 | 90 | 1 |
| | | (Hr) | 2 | 2 | 2 | 2.0 |
| Film characteristic | Amount of Na type carboxyl group | (meq/g) | 6.3 | 4.5 | 10.2 (no strength) | 2.0 |
| | Moisture absorption rate (20° C. 65% RH) | (%) | 59 | 43 | 62 | 23 |
| | Flame retardance | (LOI) | 24 | 26 | 21 | 23 |
| | Processed element | No. | D | E | F (not processed) | G |
| Element characteristic | Combustibility | | Self-extinguishing | Self-extinguishing | | Self-extinguishing |

As known from Table 2, the film samples Nos. 4 and 5 used as elements of the invention are high in moisture absorption rate, and also high in flame retardance. Elements D and E of the invention prepared from these element constituents were dried almost completely in about 20 minutes even by drying at low temperature of 70° C. in spite of very high moisture absorbing characteristic (FIG. 6).

Figure 7A:
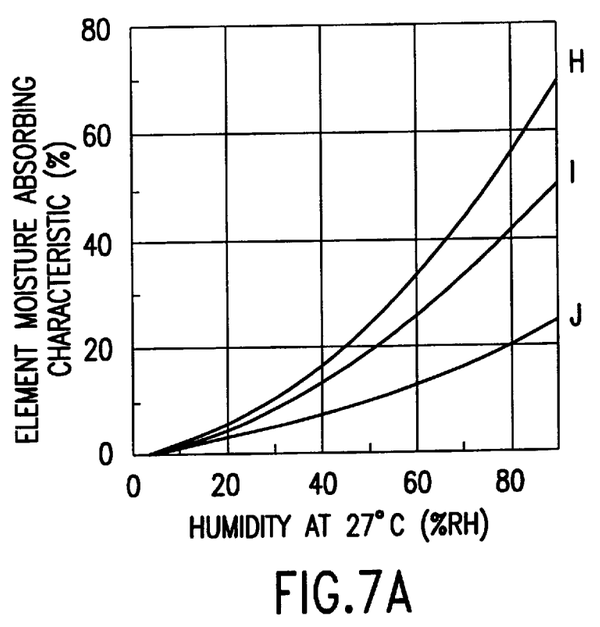
FIG. 7 is a diagram showing element moisture absorption characteristic and element regeneration characteristic of example 3.
Figure 7B:
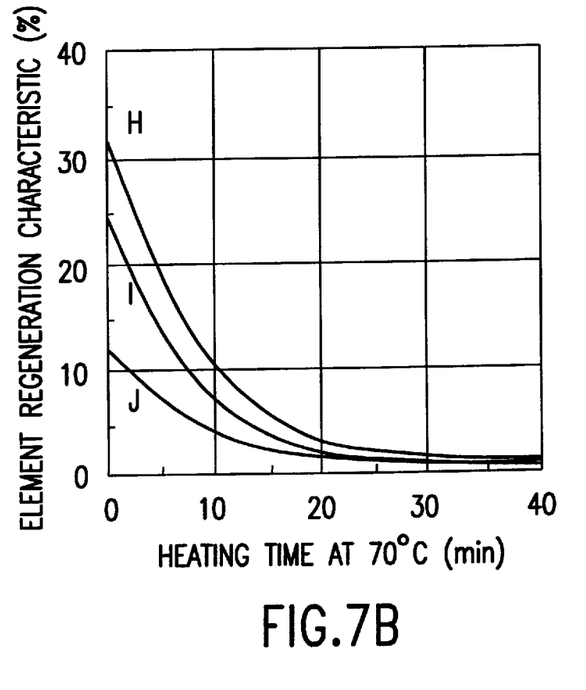

In contrast thereto, comparative film sample No. 6 was very high in the content of salt type carboxyl group, and high samples are shown in Table 3. By mixing 80 wt. % of thus obtained fiber samples Nos. 8 to 10, and 20 wt. % of polyester heat fusible (binder) fiber, paper with weight of 120 g/m² and thickness of 200 μm was prepared, and processed into an element form as shown in FIG. 2, and elements H to J were obtained. The element moisture absorbing characteristic and element regeneration characteristic are shown in FIG. 7. The combustibility is also recorded in Table 3.

TABLE 3

| | Example | | Invention | Invention | Comparison |
|---|---|---|---|---|---|
| | Fiber sample | No. | 8 | 9 | 10 |
| Crosslinking condition | Hydrate hydrazine treatment | (%) | 35 | 35 | 35 |
| | | (° C.) | 100 | 103 | 103 |
| | | (Hr) | 3 | 4 | 3 |
| Carboxyl group introduction | NaOH treatment | (%) | 10 | 10 | 5 |
| | | (° C.) | 100 | 90 | 80 |
| | | (Hr) | 2 | 2 | 1 |
| Film characteristic | Amount of Na type carboxyl group | (meq/g) | 6.5 | 4.4 | 2.1 |

TABLE 3-continued

|  |  |  |  |  |
|---|---|---|---|---|
| Moisture absorption rate (20° C. 65% RH) | (%) | 61 | 42 | 19 |
| Flame retardance | (LOI) | 25 | 26 | 24 |
| Processed element | No. | H | I | J |
| Element characteristic | Combustibility | Self-extinguishing | Self-extinguishing | Self-extinguishing |

As known from Table 3, fiber samples Nos. 8 and 9 used as principal constituent materials for elements of the invention are high in moisture absorption rate, and are also high in flame retardance. Elements H and I of the invention made by mixing said fibers with combustible fibers of polyester heat fusible (binder) fiber respectively are also known to be self-extinguishing. That is, those containing specified amount of salt type carboxyl group by crosslinking with hydrate hydrazine can be processed into paper with high safety and processed easily into elements. Besides, since the high moisture absorbing and releasing polymeric compound is fibrous, it is easily estimated that it can be easily processed into various forms aside from paper, such as nonwoven fabric, knitting, and woven fabric. Moreover, in spite of very high moisture absorbing characteristic, it is known to be dried almost completely in about 20 minutes even by drying at low temperature of 70° C. (FIG. 7).

In contrast thereto, comparative fiber sample No. 10 is small in the content of Na type carboxyl group, and low in moisture absorption rate. As known from FIG. 7, comparative moisture absorbing element J made from this fiber is lower in the moisture absorbing capability than moisture absorbing elements H and I of the invention, and it is required to be increased in size.

Example 4

Figure 8:
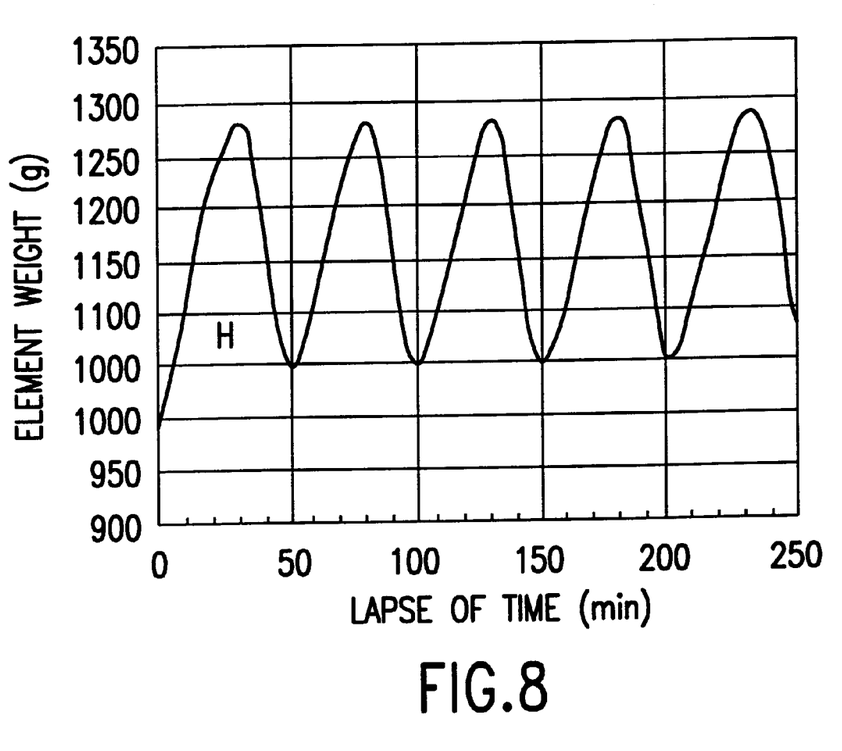
FIG. 8 is an explanatory diagram of example 4 showing characteristic by repeated use of moisture absorbing element.

Using element H of the invention in example 3, results of investigating characteristics in repeated use are shown in FIG. 8. From the state of drying the element at 70° C., air of constant temperature of 27° C. and constant humidity of 60% RH was blown to the element for 30 minutes, and hot air of 70° C. was blown again for 20 minutes, then air of 27° C. and 60% RH was blown once more for 30 minutes, and this cycle was repeated.

From FIG. 8 it is known that element H of the invention is a low-temperature regenerative type moisture absorption element having high moisture absorbing and releasing property. The performance is not lowered if regeneration and moisture absorption are repeated. This example relates to element H, but the moisture absorbing elements of the invention show characteristics similar to the results in FIG. 8.

Example 5

Figure 9A:
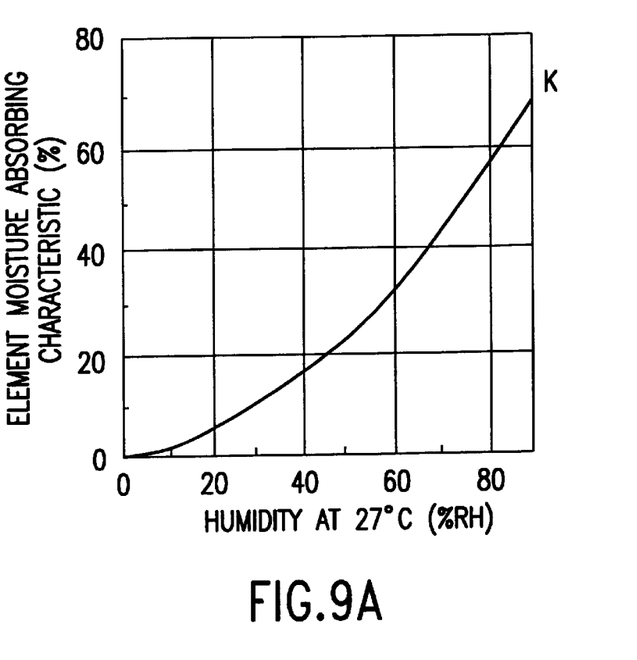
FIG. 9 is a diagram showing element moisture absorption characteristic and element regeneration characteristic of example 5.
Figure 9B:
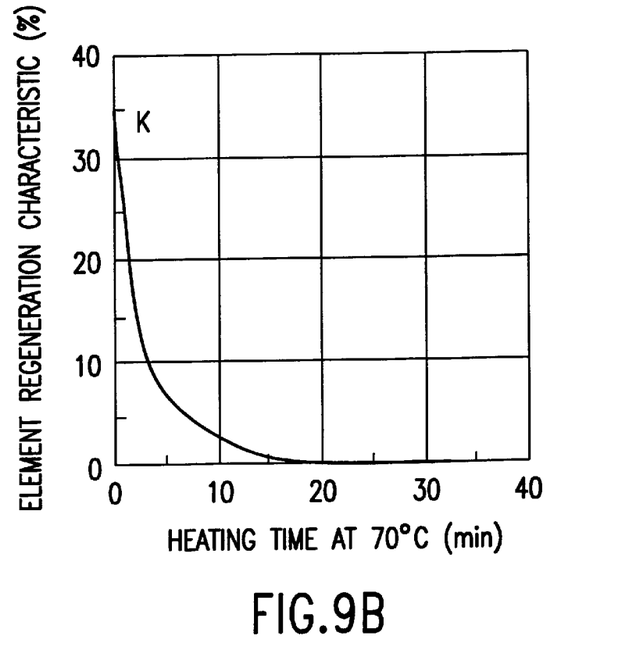
Figure 10:
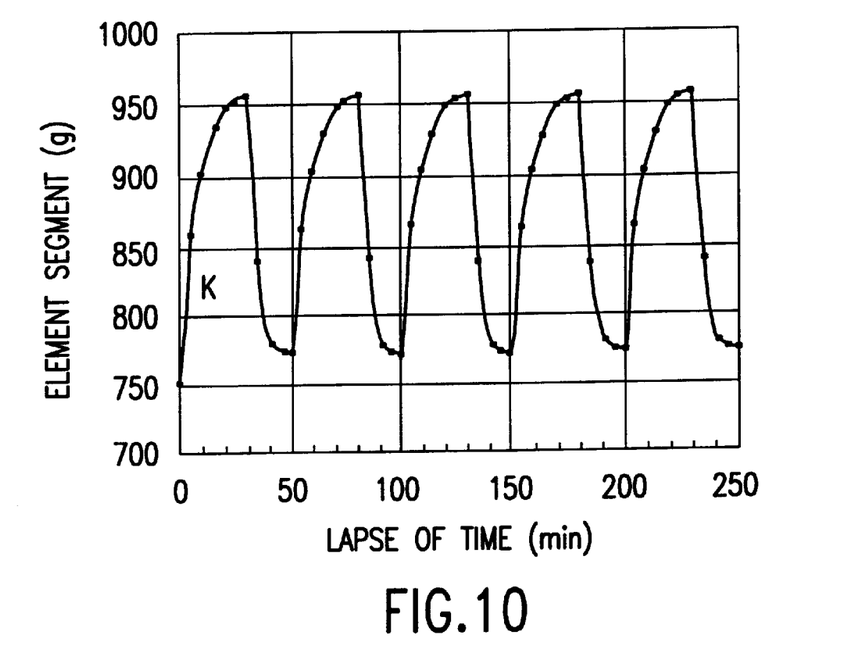
FIG. 10 is an explanatory diagram of example 5 showing characteristic by repeated use of moisture absorbing element.
Figure 11:
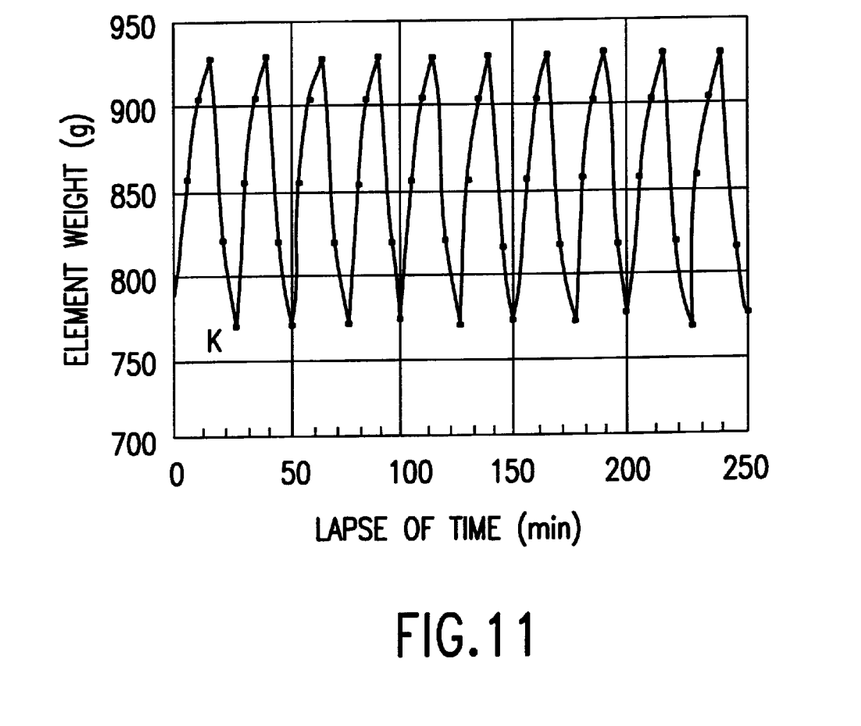
FIG. 11 is an explanatory diagram of example 5 showing characteristic by repeated use of moisture absorbing element in a short time.

In this example, 0.5 mm of fiber sample No. 8 of the invention shown in Table 3 relating to example 3 was flocked. First, both sides of the flame retardant film was coated with flame retardant adhesive by 80 g/m$^2$ on one side, and specified cut fibers were flocked on both sides, and this film was processed into an element as shown in FIG. 2, and element K was prepared. The element moisture absorbing characteristic and element regeneration characteristic are shown in FIG. 9, and results of investigating characteristics by repeated use in the same manner as in example 4 are recorded in FIG. 10. Results of investigating characteristics in shortening the repeating time, that is, moisture absorption of element at 27° C. and 60% RH for 15 minutes and regeneration at 70° C. for 10 minutes are summarized in FIG. 11.

As known from FIG. 9, in spite of very high moisture absorbing characteristic, the flocked piece is dried almost completely in about 10 minutes at low temperature of 70° C. This result shows a more excellent capability than elements H and I in FIG. 7 of the invention. Also as known from FIG. 10, in the flocked piece such as element K of the invention, the time to reach moisture absorption equilibrium is also found to be shorter. By comparison of FIG. 10 and FIG. 11, in spite of the same moisture absorbing element, it is known that the moisture absorption amount of element per 50 minutes is evidently more in FIG. 2 (sic). It is hence known that it is possible to dehumidify effectively by flocking and properly shortening the repeating time of moisture absorption and regeneration. Element K of the invention was self-extinguishing.

Example 6

Figure 12:
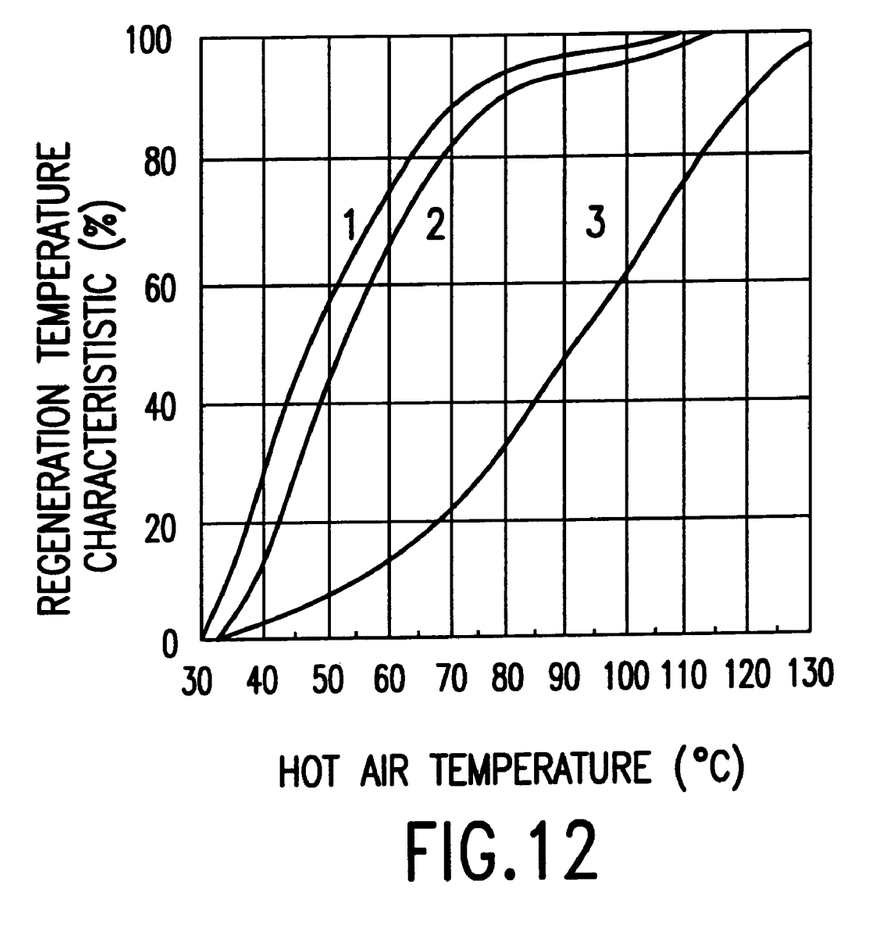
FIG. 12 is an explanatory diagram of regeneration temperature characteristic of example 6.

Using the paper used in elements H and I (indicated by 1 and 2, respectively in diagram) of the invention in example 3 and silica gel (indicated by 3) as comparative example, regeneration temperature characteristics were investigated, of which results are shown in FIG. 12.

It is known that the materials used in the elements of the invention reach 100% of regeneration temperature characteristic at 110° C., and over 80% even at 70° C. Even at 50° C., it is found equivalent to the effect of regenerating silica gel at about 90° C. In the silica gel of comparative example, at 110° C., it is evident that the regeneration temperature characteristic does not reach 100% in such a short time as in this evaluation. Hence, materials used in conventional moisture absorbing element are proved to be unsuited to materials for use in the moisture absorbing element of low-temperature regenerative type.

Moreover, when the materials used in the elements of the invention are processed into moisture absorbing elements, the curve showing the regeneration characteristic is not changed significantly, and hence a low-temperature regenerative type moisture absorbing element is obtained. When processed by flocking, moreover, the regeneration temperature characteristic of higher efficiency is shown.

The moisture absorbing element of the invention is excellent in the moisture absorbing and releasing performance, and the absorbed moisture can be released easily at low temperature, which was impossible with the conventional moisture absorbing element. It is hence possible to provide a small-sized moisture absorbing element of high efficiency and energy-saving type, and it can be used in household dehumidifying and drying applications, not limited to industrial and commercial uses. Moreover, the low-temperature regenerative type moisture absorbing elements of the invention can be applied in dehumidifying and drying of various gases, aside from the use of dehumidifying and drying water vapor in air.

What is claimed is:

1. An element for a regenerative moisture absorbing dehumidifying-and-drying apparatus comprising a woven fabric, nonwoven fabric, film or paper shaped to form plural gas passages, said woven fabric, nonwoven fabric, film or paper having a fibrous flock applied thereto, said fibrous flock comprising fibers of a high moisture absorbing and releasing polymeric compound containing from 2.5 to 10.0 meq/g of a carboxylic salt group and crosslinked by hydrazine or a derivative thereof, wherein absorbed moisture is removed from said element at a temperature of 110° C. or less to regenerate said element.

2. The element of claim 1 wherein the hydrazine compound introduces an increment of nitrogen content of about 1.0 to 10.0 wt %.

3. The element of claim 1 wherein the hydrazine compound is selected from the group consisting of hydrazine hydrate, hydrazine sulfate, hydrazine hydrochloride, hydrazine nitrate, hydrazine bromate and hydrazine carbonate.

4. The element of claim 1 wherein said woven fabric, nonwoven fabric, film or paper is shaped to form corrugations.

5. The element of claim 4 wherein said element is cylindrical.

6. The element of claim 4 wherein said element is block-shaped.

7. The element of claim 1 wherein said woven fabric, nonwoven fabric, film or paper is shaped to form a mesh.

8. The element of claim 1 wherein said woven fabric, nonwoven fabric, film or paper is shaped to form a honeycomb shape.

9. A dehumidifying and drying apparatus containing the element of claim 1.

* * * * *